E. P. PORCHER.
AUTOMOBILE TOP RAISING DEVICE.
APPLICATION FILED FEB. 9, 1917.
1,298,387.
Patented Mar. 25, 1919.
2 SHEETS—SHEET 1.
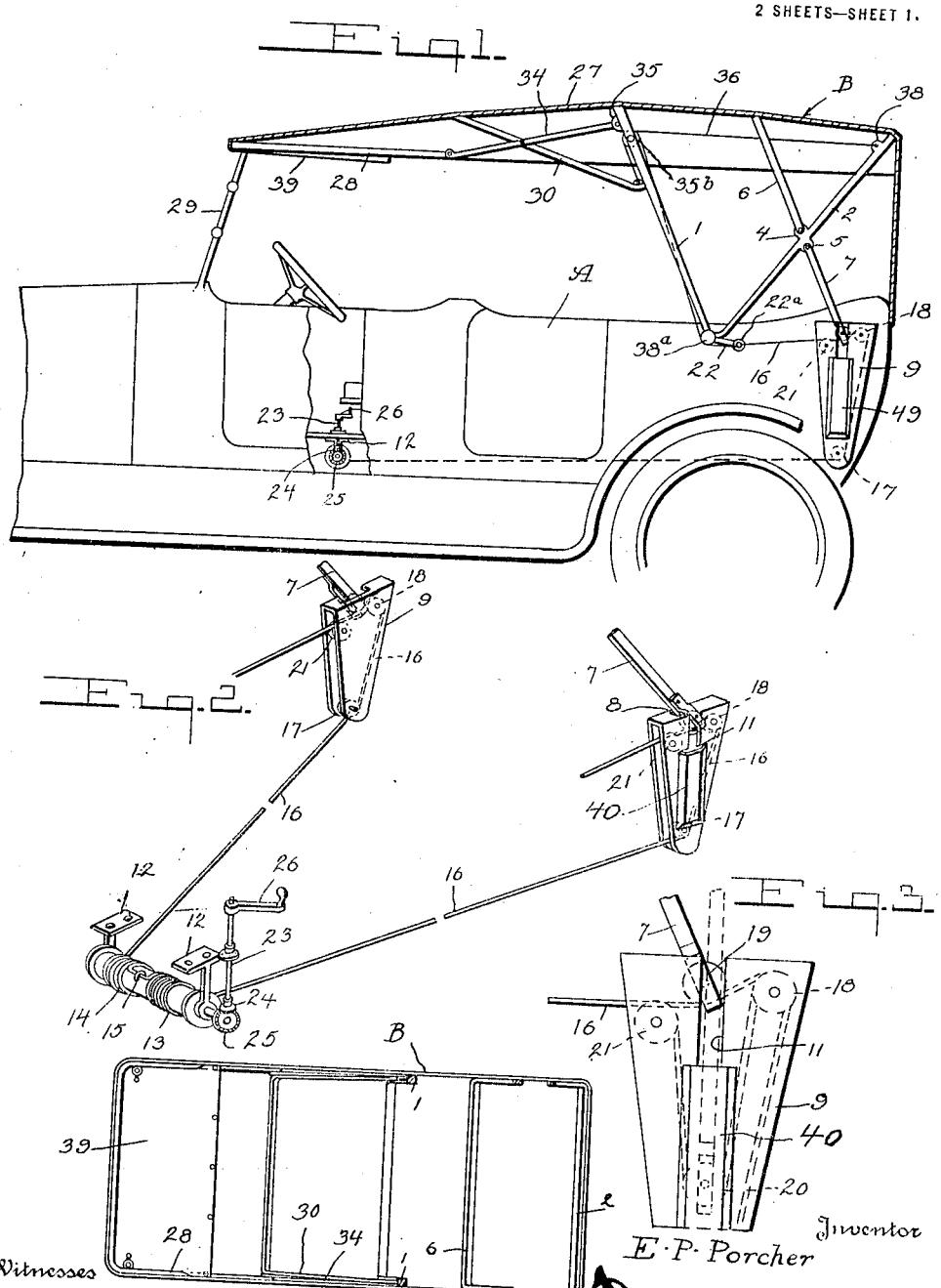

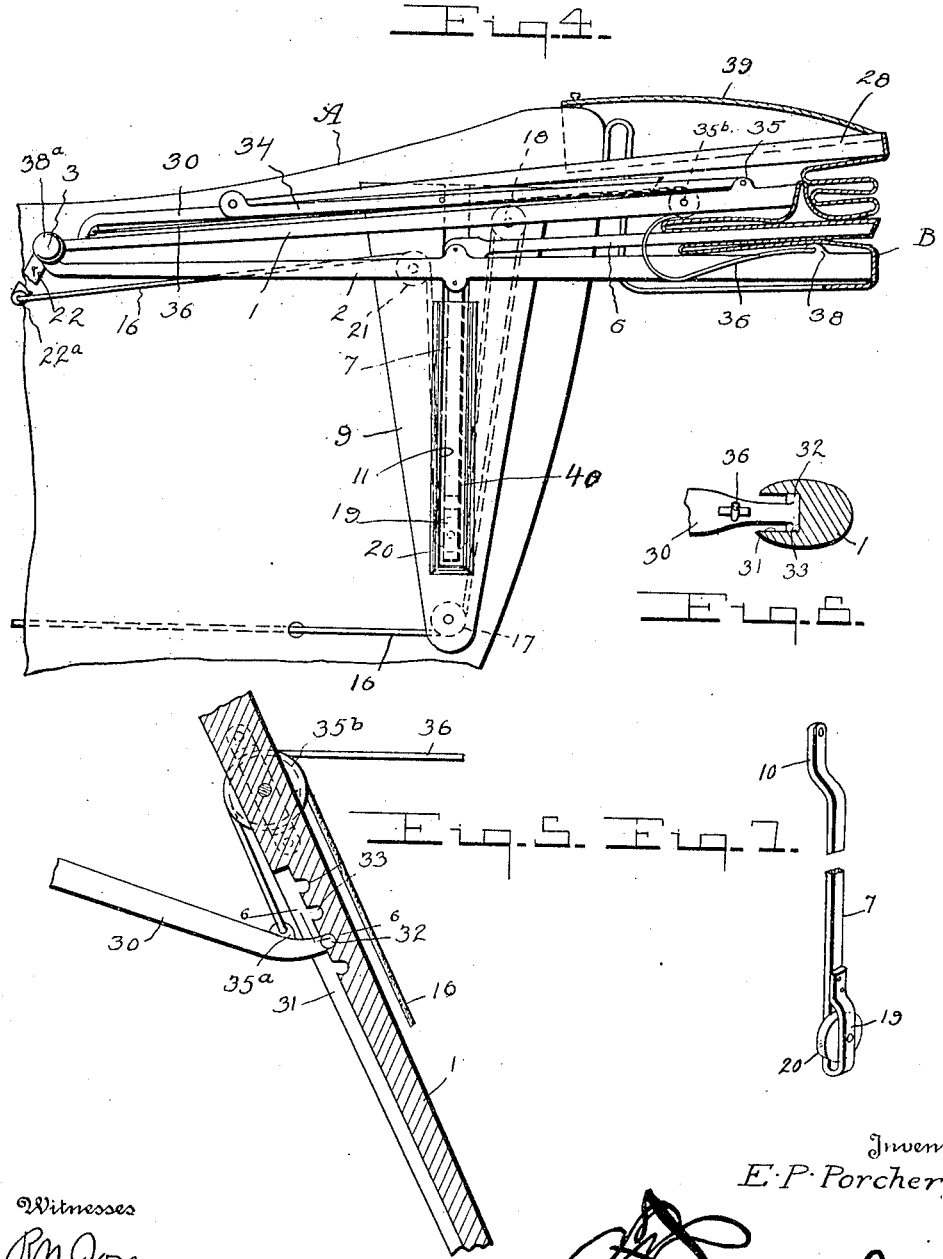

UNITED STATES PATENT OFFICE.

EDWARD P. PORCHER, OF CHARLESTON, SOUTH CAROLINA.

AUTOMOBILE-TOP-RAISING DEVICE.

1,298,387.

Specification of Letters Patent.   Patented Mar. 25, 1919.

Application filed February 9, 1917.   Serial No. 147,658.

*To all whom it may concern:*

Be it known that I, EDWARD P. PORCHER, a citizen of the United States, residing at Charleston, in the county of Charleston and State of South Carolina, have invented certain new and useful Improvements in Automobile-Top-Raising Devices; and I do hereby declare the following to be a full, clear, and exact description of the invention, such as will enable others skilled in the art to which it appertains to make and use the same.

This invention relates to improvements in mechanism for raising the foldable top of a motor vehicle, and has for its primary object the provision of a novel and efficient mechanism of this character that will admit of the top being raised from folded to operative position without necessitating the operator leaving the vehicle.

Another object of the invention is the provision of a foldable vehicle top having a supporting frame which includes a pair of lifting and supporting elements adapted to have operative connection with novel operating mechanism for operating the lifting elements when it is desired to move the top from folded to operative position.

Other objects will appear and be better understood from the embodiment of the invention of which the following is a specification, reference being had to the accompanying drawings forming a part thereof, in which:—

Figure 1 is a side view of an automobile body with the top in unfolded or operative position, showing the supporting frame constructed in accordance with my invention, Fig. 2 is a perspective view of the operating mechanism for moving the top from folded to operative position, Fig. 3 is a side view of the casing for receiving one of the lifting arms when the top is in folded position, Fig. 4 is a detail side elevation of the rear end of the vehicle body with the top in folded or inoperative position.

Fig. 5 is a longitudinal sectional view, taken through the front supporting bow of one side of the top supporting frame, and showing the manner of adjustably connecting one of the front auxiliary bows thereto, Fig. 6 is a section taken on the 6—6 of Fig. 5, and Fig. 7 is a perspective view of one of the lifting bows detached from operative position.

Fig. 8 is a horizontal sectional plan view of the top in unfolded position and looking toward the cloth covering for the top.

Referring to the drawings in detail, the letter A designates a motor vehicle body having associated therewith a foldable top, designated as an entirety by the letter B. The top B includes a supporting frame which consists of the forward or front supporting bows 1, that is of inverted U-shape in configuration and has the free ends of the sides thereof pivoted to the automobile body by means of the pivot pins 3, and rear supporting bow 2, which is likewise of inverted U-shape in configuration and has the free ends of the sides thereof pivotally connected to the respective sides of the automobile body by means of the pivot pins 3 which connect the sides of the front supporting bow 1 to the body of the vehicle. Each of the sides of the rear supporting bow 2 is provided, at opposite points, with laterally extending lugs 4 and 5. An auxiliary bow 6 is interposed between the bows 1 and 2, and is of inverted U-shape in configuration and has the free ends of the sides thereof pivotally connected to the lugs 4 on the sides of the bow 2. A pair of lifting elements 7 underlie the sides of the rear supporting bow 2 and have their upper ends pivotally connected to the lugs 5 on the respective sides of the rear supporting bow 2 and their lower ends extending through elongated slots 8 formed in the upper walls of casings 9 that are mounted on the respective sides of the vehicle body A, adjacent the rear end thereof. When the top B is in folded position, as shown in Fig. 4 of the drawings, the lifting elements 7 extend into the interiors of the casings 9, as shown in Fig. 4 of the drawings, and the upper ends of the elements 7, which are offset outwardly, as shown at 10, extend through slots 11 in the outer or front walls of the casings 9, and terminally extend below the upper ends of the casings 9 so as to admit of the bows 1 and 2 being positioned below the upper edge of the vehicle body, as shown in Fig. 4 of the drawings.

Depending from the under side of the floor of the vehicle body, at the forward end thereof, is a pair of brackets 12, within which are journaled the opposite ends of the shaft of a drum 13. A cable 14 is anchored, at a point intermediate its ends, to a drum 13, by means of a clip or staple 15, and the strands of the cable are then wound, in the same direction, around the drum, as shown in Fig. 2, and then extended in diverging relation toward the rear end of the vehicle body. The strands of the cable, which are designated 16, in Fig. 2, are then passed through openings in the forward sides of the casings 9 and passed below pulleys 17, and are then extended upwardly and trained over pulleys 18, the strands being then extended from the pulleys 18 and passed through loops 19 on the lower ends of the respective lifting elements 7, the loops 19 on the lifting elements 7 being formed by bending the lower ends of the elements upon themselves, as shown in Fig. 7. Pulleys 20 are journaled in the loops 19, and the strands 16 of the cable are passed beneath the pulleys 20 and then passed over pulleys 21 and out through openings located at the upper ends of the forward sides of the casings 9 and extended through eyes 22ª on the angularly extending arms 22 carried by the lower ends of the sides of the bow 1. A vertically disposed operating shaft 23 extends through the floor of the vehicle body, at the forward end thereof, and has the lower end provided with a bevel gear 24 which meshes with a bevel gear 25 on the adjacent end of the shaft of the drum 13. The upper end of the shaft 23 is provided with a crank handle 26, by means of which the shaft 23 can be rotated to effect rotation of the drum 13. A cloth covering, designated 27, for the top rests on and is secured to the connecting portions for the sides of the U-shaped bows 1 and 2. A U-shaped frame 28 underlies the forward end of the cloth covering 27, and when the top is in unfolded or operative position, the forward end of the frame 28 is connected to the upper end of a windshield support, designated 29, in any suitable manner. A U-shaped auxiliary bow 30 lies in advance of the U-shaped bow 1, when the top is in unfolded position, and the free ends of the sides of the bow 30 are slidably received by grooves 31. The free terminals of the sides of the bow 30 are provided with heads 32 that are adapted to be interchangeably received by notches 33 in the inner walls of the grooves 31 in the sides of the bow 1, so as to admit of the auxiliary bow 30 being placed at different angular positions with respect to the bow 1 to take up any slack in the cloth covering 27, when the top is in operative position. Rods 34 intersect the sides of the auxiliary bow 30 and are pivotally connected thereto, and the rods 34 have their opposite ends pivoted, respectively, to the frame 28 and to ears 35 on the sides of the bow 1. The free ends of the sides of the auxiliary bow 30 have eyes 35ª thereon and the ends of the strands 16 are passed over twin pulleys 35ᵇ and then extended downwardly and terminally connected to the eyes 35ª on the sides of the auxiliary bow 30. The sides of the auxiliary bow 30 have, also, connection with flexible elements 36 which are trained over the twin pulleys 35ᵇ on the upper or outer ends of the sides of the bow 1, and the flexible elements are then extended rearwardly and connected to lugs 38 on the outer ends of the sides of the bow 2. When the top is in folded position, the sides of the auxiliary bow 30 and the rod 34 lie in substantially parallelism with the adjacent sides of the bow 1 and the free ends of the sides of the auxiliary bow 30 are disposed at the inner terminals of the grooves 31. The strands 16 can be extended, if desired, upwardly through the grooves on the inner surfaces of the sides of the bow 1, or, if desired, they may be passed through suitable tubes that can be associated with the sides of the bow 1. The strands 16 in passing through the eyes 22ª on the arms 22 are trained beneath pulleys 38ª, secured to the arms 22 by the pivot pins 3, the said pulleys 38 serving to facilitate movement of the strands 16 of the cable when the same are moved either in a direction to cause folding or unfolding of the vehicle top. During the unfolding of the top, in which operation the bows 1 and 2 are moved away from each other, the flexible element 36 will be tensioned, as shown at 36, and pull upwardly on the free ends of the sides of the bow 30, thereby raising the bow 30 to the position shown in Fig. 1, this raising of the bow 30, in turn, effecting the raising of the rods 34 to the positions shown in Fig. 1.

A flap 39 underlies the forward end of the cloth bow or frame 28 and has its forward edge permanently secured to the cover and its rear edge detachably connected to the cover. When the top is in folded position the detachable edge of the flap 39 is released from the cover 27 and connected in any suitable manner to the upper edge of the back of the rear seat of the vehicle, as shown in Fig. 4, the flap when in this position serving as means for excluding dust etc. from entering the interior of the folded top.

When the top B is in folded or inoperative position, as shown in Fig. 4 of the drawings, and it is desired to raise the same to operative position, as shown in Fig. 1, the shaft 23 is rotated in that direction that will cause the drum 13 to be rotated in a direction where it will cause the strands 16 of the cable 14 to be wound therearound. This winding of the strands 16 of the cable on the drum 13 will effect movement of the free ends of the sides of the bow 30 toward the top portion of the bow 1, and effect outward movement of the auxiliary bow 30 and the rods 34 to unfold the forward portion of the top. Upon further winding of the strands 16 on the drum 13, the strands will exert a rearward pull on the arms 22 of the bow 1 and effect movement of the bow 1 to the position shown in Fig. 1, and also effect raising of the lifting elements 7 so as to project the same through the slots 8 in the upper walls of the casings 9, this upward movement of the lifting element effecting raising of the rear bow 2 to the position shown in Fig. 1, which will effect a complete unfolding or the top.

The outer or those sides of the casings 9 that have the slot 11 therein, are provided with outwardly offset portions 40 that provide guide grooves for the reception of the loops 19 on the lower ends of the lifting elements 7, when the latter are in lowered position.

It is evident that various changes might be resorted to in the construction, form and arrangement of the several parts without departing from the spirit and scope of the invention as claimed.

What I claim is:

1. The combination with a vehicle body having a foldable top associated therewith and including a pair of movable supporting bows pivotally connected with the body and adapted when in inoperative position and the top folded to lie in superposed relation, of a casing mounted on the vehicle body, a vertically movable lifting element slidably mounted in the casing and having connection with one of the bows, a laterally extending arm carried by the other bow, a rotatable drum mounted on the vehicle body, and a flexible element having connection with the lifting element and the arm and adapted to be wound around the drum so as to effect raising of the bows from inoperative to operative position when it is desired to unfold the top.

2. The combination with a vehicle body, of a foldable top associated with the body and including a cover and front and rear pivotally mounted supporting bows and a frame connected to the front bow by rods, pulleys associated with one of the bows, an auxiliary bow mounted for sliding movement on the front bow and adapted to lie parallel therewith when the top is in folded position, casings mounted on the vehicle body, pulleys located within each casing and disposed at the upper end thereof, lifting elements slidably mounted within the casings and having connection with the rear supporting bow, pulleys carried by the lifting elements, a rotatable drum, and a flexible element trained around the pulleys in the casing and the pulleys on the lifting elements and on the supporting bow and having connection with the auxiliary bow and adapted to be wound around the drum when the top is in folded position so as to effect raising of the front and auxiliary bows from folded to unfolded position and to raise the lifting elements from the casings so as to effect movement of the rear supporting bow to unfolded position.

In testimony whereof I affix my signature in presence of two witnesses.

EDWARD P. PORCHER.

Witnesses:
M. T. STIEN,
A. C. WALKER.

Copies of this patent may be obtained for five cents each, by addressing the "Commissioner of Patents, Washington, D. C."